United States Patent [19]

Choplin

[11] 4,420,046
[45] Dec. 13, 1983

[54] PROTECTION DEVICES FOR HORSE SHOES

[76] Inventor: Jean-Pierre R. Choplin, Jouarre, Seine Marne, France

[21] Appl. No.: 284,797

[22] Filed: Jul. 20, 1981

[51] Int. Cl.³ ............................. A01L 7/02; A01L 5/00
[52] U.S. Cl. ................................ 168/14; 168/DIG. 1; 168/26
[58] Field of Search .................... 168/4, 11, 14, 17, 19, 168/26, 28, DIG. 1

[56] References Cited

U.S. PATENT DOCUMENTS

| | | | |
|---|---|---|---|
| 176,733 | 5/1876 | Bishop | 168/26 |
| 252,251 | 1/1882 | Raymond | 168/26 |
| 483,691 | 10/1892 | Kress | 168/28 |
| 3,494,422 | 2/1970 | Clark | 168/DIG. 1 |
| 3,548,947 | 12/1970 | Mackay-Smith | 168/DIG. 1 |
| 3,907,036 | 9/1975 | Capone | 168/26 |

FOREIGN PATENT DOCUMENTS 32972  6/1912  Sweden .................................. 168/14

*Primary Examiner*—Robert P. Swiatek
*Attorney, Agent, or Firm*—Weiser & Stapler

[57] ABSTRACT

Horse hoof wear appliance of thermoplastic elastomer, preferable polyurethane, made of two parts, one a strip conforming to the contour of the horny hoof portion of the hoof, with its rear ends united near the hoof buttresses by a connecting strap to form an annulus, the other a closure plate removably attachable for completely closing the free space inside the annulus. The ground bearing surfaces of annulus and the ground bearing surface of closure plate are coplanar and each has longitudinal and transverse anti-skid relief sculptures, divided into four separate regions, forward, rearward, and lateral, and all extending mainly parallel to the adjoining edges of the appliance.

7 Claims, 4 Drawing Figures

U.S. Patent  Dec. 13, 1983  Sheet 1 of 2  4,420,046
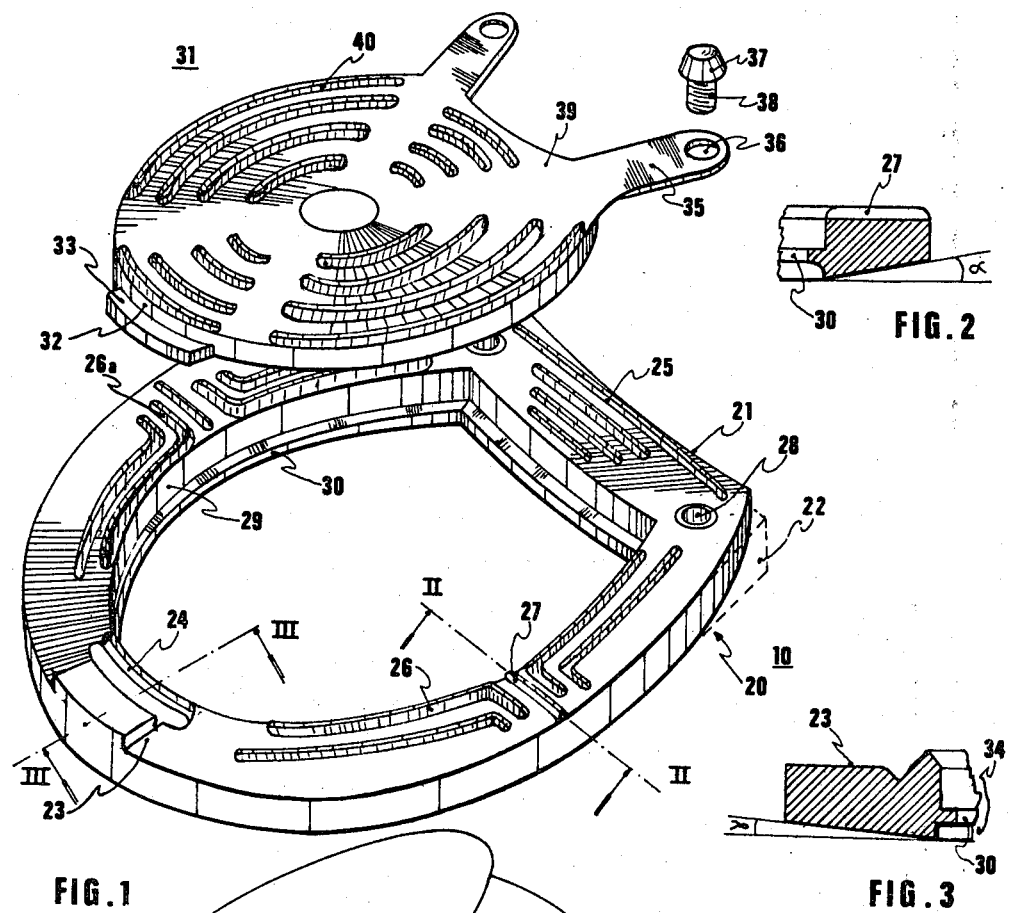
FIG. 1   FIG. 2   FIG. 3
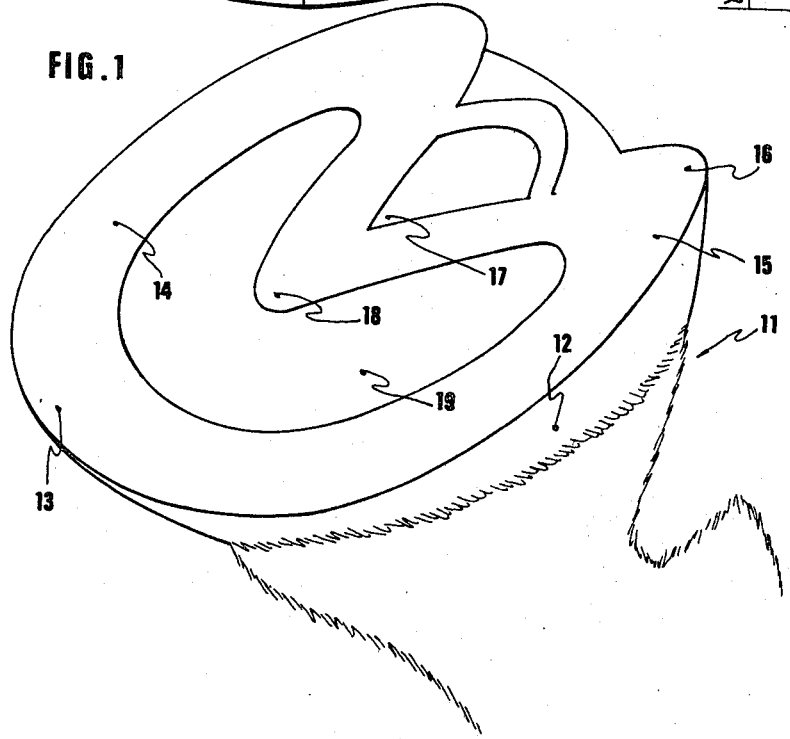

PROTECTION DEVICES FOR HORSE SHOES

The invention relates generally to the sport of horseback riding, in the field of the farrier's trade. The invention relates more specifically to improvements in wear appliances of thermoplastic elastomeric material for the protection of the horse's hooves.

To begin with, before discussing the principal features which are the object of the above-mentioned improvements, it is appropriate to recall the difficulties encountered in using appliances for horse hooves which have previously been proposed.

Current farrier's techniques have changed little in the last thousand years or so, that is since the adoption of steel horseshoes, whose principle has changed very little until now. It is true that the qualities of the metals used have improved as a result of the developing know-how in the metallurgical industry, and also that new shapes have appeared that are suited to each specific use of the horse. Thus, there exist currently three major categories of horseshoes:

(a) the classical steel horseshoe used for the vast majority of saddle horses;
(b) the racing shoe, manufactured from lighter metals;
(c) the orthopedic shoe used to correct natural or accidental malformation of the hoof.

The traditional steel shoe has almost 99% of the market but, from the technological standpoint, this type has serious drawbacks. First, these shoes are very slippery on hard soil and especially on roads. Many serious accidents, some even fatal, have resulted from falls on macadam, or on very hard and dry soil. Moreover, these shoes are rigid, they prevent the foot from exhibiting its natural physiological elasticity when the hoof is placed on the ground while stepping. This is a major drawback, because it creates a certain impediment for the horse, which tolerates this more or less well. A second drawback is the weight. A conventional shoe weighs between 400 and 600 grams, which amounts for the four legs to an excess of 1.6 to 2.4 kilograms. One might think that this weight is trivial in comparison to the weight of the horse, which may be between 350 and 600 kilograms. However, all the experts recognize that this handicap is deterimental to performance.

To improve the adhesion of metal shoes, it has been attempted to equip them with wear appliances of soft materials, such as hemp rope, felt or straw. Such rope is held inside the arms of the shoe by means of a bent-over metal piece.

The oldest state of the art known to the applicant is shown in German Pat. No. 79332, filed Aug. 7, 1894.

Such bent-over appliances wear out very rapidly, their anti-skid effect is very slight, and most of all these shoes have not been developed because of difficulties of manufacture, of adaptation, and of the danger to the horse's foot created by the presence of a metallic appliance carrier in an area not naturally protected by horn.

In more recent embodiments, resort has been had to certain plastic materials to provide wear appliances but the results obtained have been insufficiently encouraging to give rise to intensive usage.

The first of these recent embodiments appeared on the market about 20 years ago; this is the sole called "HH" of plastic material for race horses. Its shape is relatively undeveloped, and it is made from an elastomeric material which wears out too rapidly. Moreover, this appliance does not address the problem of longitudinal or transverse skidding, nor does it overcome the suction effect on slippery terrain. An example of such an appliance is described in German Patent Application No. 2,658,348. This product is difficult to apply because it requires use of a special glue which is extremely harmful to the hygiene of the hoof, and is very expensive. The sole of the hoof, which is a tender area, is unprotected. The appliance itself has no anti-skid sculptures.

As regards the technology of plastic soles, reference is also made to U.S. Pat. No. 3,494,422.

The products which are currently on the market do not meet the real needs of the users because, either the product is to primitive and wears out rapidly, or it is very expensive and anatomically unsuited.

There exists a problem which is common to metallic shoes and to synthetic appliances and to which no solution has been found, this is the suction phenomenon on slippery terrain. Finally, the plastic appliances which are currently available on the market provide no satisfactory solution to the problem of adhesion and support upon all types of soils.

Accordingly, the present invention has for its object, improvements in wear appliances of elastomeric material for horse hooves which impart improved support and adhesion properties, with due regard to the physiological function of the hoof so as to make them perform better upon soils of varied consistency and type.

Another object is to provide a wear appliance of elastomeric material which has increased resistance to wear, which is conventionally applied by nailing, and which has a closure plate removable from the sole of the hoof and capable of being put in place or removed very rapidly without tools by a non-expert.

More specifically the invention relates, in order to achieve its principal object, to a wear appliance of thermoplastic elastomer, preferably polyurethane, for the protection of horse hooves, comprising on the one hand a wear appliance in the form of a strip of material which conforms to the horny portion of the hoof, the rear ends of this strip being united in the region of the bars of the hoof by a connecting strap, so that the strip of material is continuous in the general form of an annulus.

On the other hand, a closure plate is attachable in removable fashion to the appliance, to completely close the open space within the plane of the annulus. This appliance is noteworthy in that the bearing plane on the ground of the annular strip is level with the bearing plane in the ground of the closure plate, and in that each of them has anti-skid relief sculptures, longitudinal on the one hand, transverse on the other hand, these sculptures being divided into four regions separated by interruptions, a forward region in the area of the toe, a rearward region in the area of the connecting strap, two lateral regions in the area of the side walls of the hoof, the sculptures of each region extending mainly over the major portion of its length, parallel or substantially parallel to the edges of the strip and of the removable closure plate.

Due to this first general arrangement, the wear appliance has shown itself to be skid resistant longitudinally and transversely. It is approximately four times lighter than a steel shoe, its life is approximately three times that of an aluminum shoe, its traction is increased on all soils; finally it completely protects the sole of the hoof from encounter with bruising bodies while counteracting the suction effect on adhesive terrain.

In accordance with a preferred embodiment, the removable closure plate is engaged by inserting it into the inner edge of the appliance, where it bears against a support ledge forming an abutment which limits penetration, this closure plate being immobilized against this ledge, interrupted in the region of the toe, on the one hand by means of a tab which fits into a bearing recess formed in the thickness of said toe, on the other hand by latching clamps in the general form of a tongue which clamp by simple pressure and elastic deformation below the free edge of the bearing ledge, the closure plate preferably comprising two latching clamps situated at the outer edge near the rearward ends of the side arms of the appliance.

This embodiment makes possible the application of the plate, for example, at each use of the animal and its removal during inactive periods. Thus, after each use, the closure plate can be removed, for example by using the flat of a screw driver as a lever. The sole of the hoof can be cleaned and left exposed to the air until the next use. This manner of mounting permits, in case of wear, instantaneous replacement of the worn plate by a new plate, without also having to change the appliance. This technique is within the capability of a non-expert and thereby makes it possible to dispense with one's intervention.

Other features and advantages will also appear from the detailed description which follows of embodiments provided here by way of example and illustrated in the accompanying drawings in which:

FIG. 1 is a perspective, exploded view of the components of the appliance according to a first embodiment;

FIG. 2 is a partial sectional view along II—II of FIG. 1;

FIG. 3 is a sectional view of the appliance along III—III of FIG. 1; and

Figure 4:
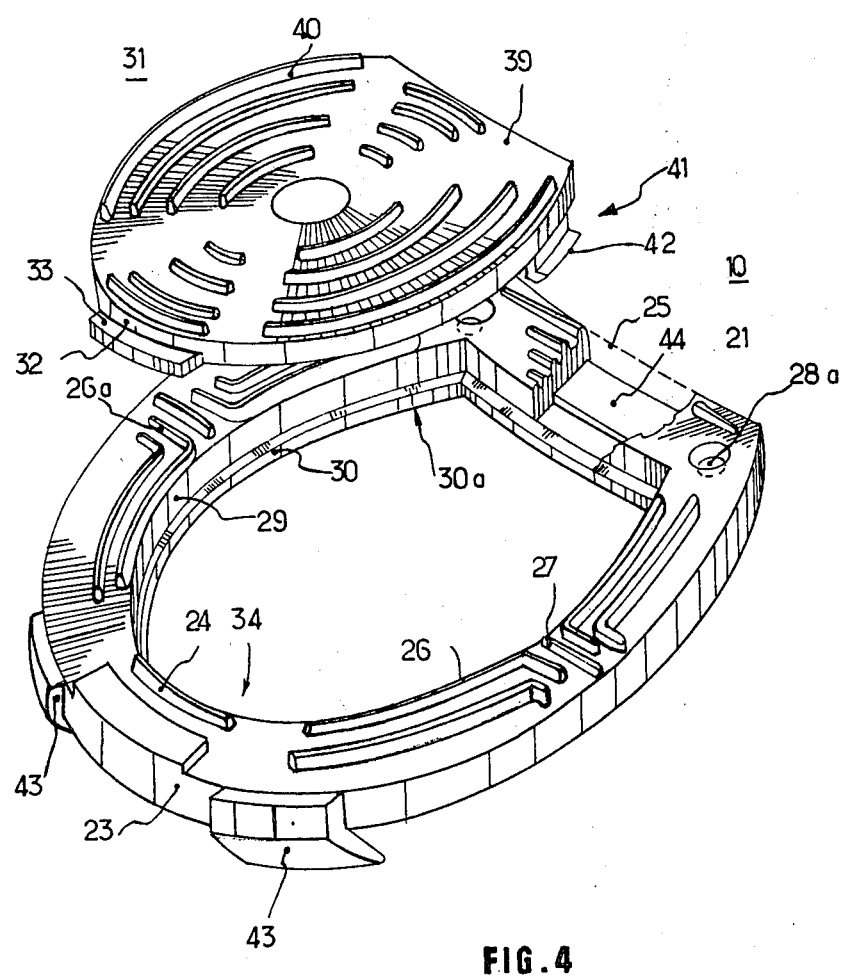
FIG. 4 is a perspective view showing a preferred embodiment of the combined appliance-closure plate.

According to the invention, as shown in the accompanying drawings, the wear appliance for the protection of horse hooves is designated by the general reference numeral 10.

Since the appliance is in close relationship to the anatomy of hoof 11, it is desirable to recall its principal constituent elements. The hoof is composed of a horny portion, surrounded by a wall 12, and a ground support plate upon which there are discernible, in the forward portion, the toe 13, in the lateral portions the side walls 14, rearward portions the quarters 15, followed by the buttresses 16, at which there originate bars 17 ending in a point on frog 18, and finally interiorly a recessed portion called sole 19.

The wear appliance 20, formed of a continuous strip, is made of a molding of a thermoplastic elastomer, selected preferably from the pure polyurethanes, having a hardness of 65 shore. The appliance 20 has, in the region of the buttresses 16 of the hoof, a strap 21, slightly arched in the horizontal plane, and united with the rear ends of the side arms of the appliance. It will be understood that, through this arrangement, the arms of the appliance are capable of lateral deformation as shown by broken lines 22 in FIG. 1. Since the hoof is inherently supple, there has been desired a construction of the appliance which preserves this natural suppleness, because it performs a shock absorbing role which is very important and which is considerably reduced and perhaps even eliminated by the use of metallic shoes. Thanks to the physical characteristics of polyurethane and the specific construction of the appliance, the hoof preserves its suppleness, but only within certain limits, so as to exert an elastic restoring force which prevents the walls of the hoof from spreading too far under the added weight of the rider.

The ground-bearing plane of the continuous annular strip and the ground-bearing plane of the closure plate are level with each other.

The ground contact surface of the appliance has, in a forward region 23 corresponding to the toe, at least one relief sculpture 24, which resists skidding of the appliance in the direction of the axis III—III. Similarly, the strap 21 has several parallel relief sculptures 25, distributed over the width of the strap. The appliance further has, in its two lateral portions, in the area of the side walls of the hoof, sculptures 26, symetrically placed on one side and the other of a transverse sculpture 27.

The sculptures 26 preferably extend over the major portion of their lengths perpendicular to transverse sculpture 27. In this manner the appliance is anti-skid, in the longitudinal direction indicated by the section line III—III, and in the transverse direction indicated by the section line II—II.

At the junction of strap 21 and of the rear ends of the lateral arms, the appliance has threaded inserts 28 whose function is described later.

Along the inner edge 29, the appliance has a bearing ledge 30 for a closure plate designated by the general reference numeral 31. The ledge is substantially continuous, with an interruption in the area of toe 23.

The closure plate 31 is mounted by engagement with the interior of inner edge 29 of the appliance, and abutting against ledge 30. The closure plate 31 has in its forward portion 32 a tab 33 which seats in a bearing recess 34 provided in the toe portion 23 of the appliance. Because of this, the closure plate is firmly immobilized inside inner edge 29 of the appliance. Immobilization of the closure plate is completed by attachment tabs 35, pierced by an aperture 36 for the passage of a bolt 37, whose shaft 38 screws into inserts 28 of the appliance.

The sole 39 of the closure plate 31 has sculptures 40 divided into four regions, corresponding to the distribution of the sculptures in the appliance, these sculptures taking the form of rows parallel to the contour of said closure plate. It will be noted that the sculptures 40 are interrupted in order to define the four regions. This makes it easier to remove dirt from the closure plate. Due to the presence of the closure plate, the tender portion of the hoof is completely protected, the bruising bodies encountered upon soils of all kinds no longer being capable of contacting this tender portion, which has a considerable effect upon the sureness of placement of the hoof. Moreover, the closure plate 31 eliminates the suction effect of slippery terrain, which is well-known in competition. Finally it will be noted, as shown in FIGS. 2 and 3, that the contact surface of the appliance with the horn of the hoof exhibits, in transverse section, an internal-external slope of about 5°, due to which there is obtained a self-centering effect of the appliance on the hoof, when the latter has a complementary slope.

As for application, this is very easy because due to the material used, the farrier no longer needs forge or anvil, which are heavy and bulky.

Simple cutting pliers are sufficient for adjusting the plastic appliance to the exact shape of the hoof. Seven or eight nails make it possible to hold the appliance, and its application itself remains conventional, because the shape of a horse's hoof is unchanging.

Although the embodiment just described is satisfactory, it will be noted that under exceptionally difficult service conditions, as for example in some equestrian sports such as jumping, or upon certain soils which are particularly agressive, there occurred premature wear of the attachment tabs of the closure plate, particularly when the anti-skid bars of the appliance underwent a reduction in height through normal wear.

There has also been noted, always under conditions of intensive usage, and especially the strain due to jumping practice, a tendency for the appliance to become displaced relative to the hoof.

In the embodiment of FIG. 4, the appliance 10 is specially designed for exceptionally difficult conditions of use, as for example competitive events, jumping, and in general all cases of intensive use.

In this embodiment, the attachment tabs 35 of the closure plate 31 of the first embodiment have been eliminated and have been replaced by latches 41 in the general form of tongue or clamps, that is, having like the attachment tab 33 a tongues 42 which becomes engaged through elastic deformation beneath the free edge 30a of the bearing ledge 30. In this embodiment, the closure plate 31 is mounted by insertion within the inner edge 29 of the appliance. The tab 33 is engaged in recess 34 of the appliance at the toe 23 as before, then the tongues 42 become engaged by continuing to push the closure plate into its seat so that, through slight elastic deformation, the tongues 42 which extend beyond ledge 30 resume their natural starting position and are retained by the edge 30a of the ledge.

Removal of the closure plate takes place by using a lever, for example, the blade of a screw driver, which is introduced between the plate and straps 21 of the appliance.

In this embodiment, the closure plate 31 has two latches in the form of tongues 42 located on the sides of the closure plate.

To counteract the tearing-away forces and the axial and lateral displacements of the appliance relative to the horny bearing surface of the hoof, especially when the appliance is subject to shocks, the appliance is provided in the neighborhood of toe 23 with at least one upstanding abutment. This upstanding abutment may be positioned along the toe, particularly if there is involved an appliance for the forward hooves, but for the rear hooves, as shown in the drawing, the appliance has two abutments 43, which provide both axial and lateral immobilization of the appliance relative to the hoof.

The reinforcing means of the appliance are completed by a metallic plate 44 which is buried in the thickness of the strap 21 connecting the lateral arms of the appliance.

The plate 44 has in the neighborhood of its extremities two threaded portions 28a, e.g. threaded bushings, which do not extend all the way to the central plane of the bearing surface of the appliance against the ground, so that the threads are protected by the material constituting the appliance. These threads can receive different types of bolts and particularly conventional bolts known in themselves, for example, metal bolts which may or may not be reinforced.

It will also be noted that the toe 23 has, in the area of its ground bearing portion, an increased thickness equal to the thickness of the anti-skid ridges.

It will be understood that the invention is not limited to the embodiment shown, which can be envisioned to have other variants, without thereby departing from the scope of the appended claims.

I claim:

1. Wear appliance of thermoplastic elastomer, preferably polyurethane, for the protection of horse hooves, comprising on the one hand a wear appliance in the form of a strip of material conforming to the contour of the horny portion of the hoof, the rear ends of the strip being united in the area of buttresses of the hoof by a connecting strap so that the strip of material becomes continuous, of generally annular shape, on the other hand, a closure plate attachable in removable manner to the appliance for completely closing the free space located on the inside of the plane of the annulus, the appliance being characterized in that the ground bearing surface of the annular strip and the ground bearing surface of the closure plate are at the same level and that each comprises anti-skid relief sculptures, some longitudinal and some transverse, these sculptures being divided into four separate regions by interruptions, a forward portion on and near the toe, a rearward portion on and near the connecting strap, two lateral portions near the hoof side walls, the sculptures in each region extending principally over the major part of their length parallel or substantially parallel to the edges of the strip and of the closure plate.

2. Appliance according to claim 1, characterized in that the sculptures in the two lateral regions of the continuous strip, near the hoof side walls, are symmetrically positioned on one side and the other of a sculpture which is transverse to the strip, these sculptures having distinct shorter and longer portions and extending on the one hand along their shorter portion parallel to said transverse sculpture, on the other hand over their longer portion parallel to the edges of the strip.

3. Appliance according to claim 1, characterized in that the removable closure plate is attached by engagement in the inside edge of the appliance where it rests against a bearing ledge forming an insertion limiting abutment, the closure plate being immobilized against this ledge which is interrupted at the toe, on the one hand by means of a tab which engages a bearing recess provided in the thickness of said toe, on the other hand by means of attachment tabs applied against the junction of the strap and of the rear ends of the appliance, these tabs being attached to the appliance by screws or bolts threaded into inserts placed in the thickness of the appliance.

4. Appliance according to claim 1, characterized in that the annular strip comprises, in the vicinity of the toe, at least one upstanding abutment which is capable of partially covering the horny portion of the hoof.

5. Appliance according to claim 1, characterized in that it comprises in the thickness of the connecting strap which unites the lateral arms, a metallic reinforcement plate for the attachment by screwing of removable bolts.

6. The wear appliance of claim 1 wherein the contact surface of the appliance with the hoof has an internal-external slope of approximately 5°, matching a complementary slope of the hoof, whereby a self-centering effect of the appliance on the hoof is provided.

7. Wear appliance of thermoplastic elastomer, preferably polyurethane, for the protection of horse hooves, comprising on the one hand a wear appliance in the form of a strip of material conforming to the contour of the horny portion of the hoof, the rear ends of the strip being united in the area of the buttresses of the hoof by a connecting strap so that the strip of material becomes continuous, of generally annular shape, on the other hand, a closure plate attachable in removable manner to the appliance for completely closing the free space located on the inside of the plane of the annulus, the appliance being characterized in that the ground bearing surface of the annular strip and the ground bearing surface of the closure plate are at the same level and that each comprises anti-skid relief sculptures, some longitudinal and some transverse, these sculptures being divided into four separate regions by interruptions, a forward portion on and near the toe, a rearward portion on and near the connecting strap, two lateral portions near the hoof side walls, the sculptures in each region extending principally over the major part of their length parallel to substantially parallel to the edges of the strip and of the closure plate, the removable closure plate being emplaced by engagement within the inner edge of the appliance where it rests upon a bearing ledge forming an insertion limiting abutment, the closure plate being immobilized against this ledge which is interrupted at the toe, on the one hand by means of a tab which engages a bearing recess provided in the thickness of said toe, on the other hand by means of latching clamps, in the general shape of a tongue, which latches by simple pressure and by elastic deformation below the free edge of the bearing ledge, said closure plate preferably comprising two latching clamps positioned on the lateral sides near the rear ends of the lateral arms of the appliance.

* * * * *